No. 805,191. PATENTED NOV. 21, 1905.
W. C. FLUGAN.
TRIMMING AND WEEDING IMPLEMENT.
APPLICATION FILED AUG. 22, 1905.

Witnesses.
Robert Everett,
James L. Norris, Jr.

Inventor.
William C. Flugan.
By James L. Norris
Att'y.

UNITED STATES PATENT OFFICE.

WILLIAM C. FLUGAN, OF LISBON, OHIO.

TRIMMING AND WEEDING IMPLEMENT.

No. 805,191. Specification of Letters Patent. Patented Nov. 21, 1905.

Application filed August 22, 1905. Serial No. 275,238.

*To all whom it may concern:*

Be it known that I, WILLIAM C. FLUGAN, a citizen of the United States, residing at Lisbon, in the county of Columbiana and State of Ohio, have invented new and useful Improvements in Trimming and Weeding Implements, of which the following is a specification.

This invention relates to an implement especially adapted for trimming lawn edges adjacent to a sidewalk or path, but may also be used for removing weeds and improper growths in a lawn, as well as for weeding gardens or forming trenches between rows of plants.

The advantage of the improved implement is that it may be used to effectively pick up and carry portions of removed sod, weeds, and other objectionable growths, and, further, that it may be used with either side against the lawn to be treated or to detach and remove weeds growing in the crevices between the stones or other means used in the formation of a pavement or walk.

Another advantage of the improved implement is its simplicity of structure, comprising, essentially, a head formed from a single piece of sheet steel or other suitable sheet metal having a trough-like contour, the sides being of equal vertical extent and merging into a substantially semicircular bottom to avoid the formation of angles which would have a deteriorating effect on the implement as to wear.

The remaining part of the simplified form of the implement consists of a handle which is secured in and closes the rear extremity of the head, and the sides of the latter are directly attached to the handle without requiring any additional structural features for the application of the handle.

Figure 1:
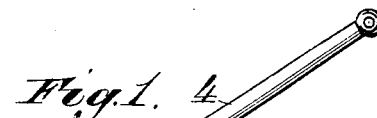
Figure 2:
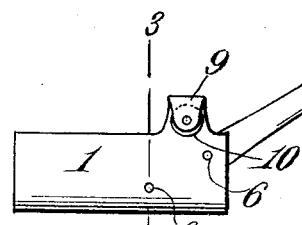
Figure 4:
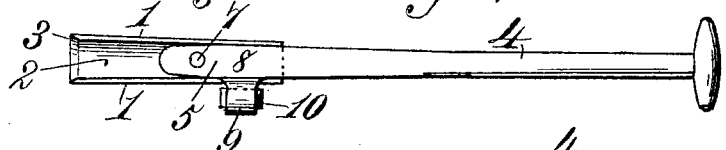
Figure 4:
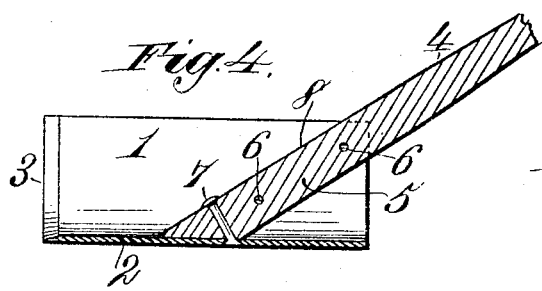
Figure 3:
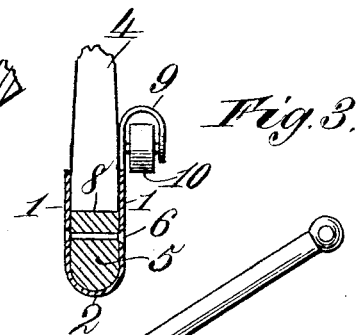
Figure 5:
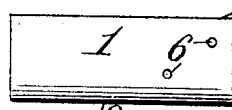
Figure 7:
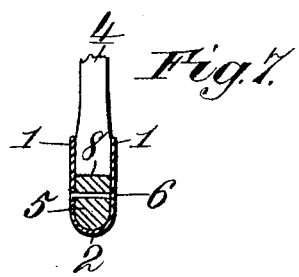
Figure 6:

In the drawings, Figure 1 is a side elevation of an implement embodying the features of the invention and illustrating an antifrictional guard forming a part thereof. Fig. 2 is a top plan view of the implement. Fig. 3 is a transverse vertical section on the line 3 3, Fig. 1. Fig. 4 is a central longitudinal vertical section through the head and a portion of the handle of the implement. Fig. 5 is a side elevation of a slightly-modified form of the implement. Fig. 6 is a top plan view of the head and a part of the handle of the implement shown by Fig. 5. Fig. 7 is a transverse vertical section through the head of the implement shown by Figs. 5 and 6.

Similar numerals of reference are employed to indicate corresponding parts in the several views.

Referring particularly to Figs. 1, 2, 3, and 4, the head of the implement comprises opposite sides 1 of equal vertical extent, continuous with and merging into a semicircular or rounded bottom 2, the sides slightly flaring toward the front end of the head, as clearly shown by Fig. 2, the front edges of the sides and bottom being sharpened, as at 3. The head of the implement just set forth is composed, preferably, of a single piece of sheet steel or other suitable metal bent into the shape specified and adapted to have its proportions and dimensions varied as may be found desirable for different uses. The head is operated by a handle 4, having a suitable grip at its upper end and provided with a lower enlarged extremity 5, which is inserted between the sides 1 of the head and projected beyond the transverse center of the bottom 2 and secured by suitable fastenings extending through the sides and the said enlarged extremity in transverse directions, as at 6, and also vertically through the bottom 2 and the forward portion of the said enlarged extremity, as at 7. The projection of the lower enlarged extremity 5 of the handle 4 into the head of the implement, as stated, renders the said head strong and durable and gives it such rigidity that it will be effective in its several operations and permits the use of a light material in the formation of said head. The upper surface 8 of the lower extremity 5 is flat and regularly inclined upwardly and rearwardly to facilitate the removal of dirt, weeds, and the like from the head in the event of clogging during the cutting operation of said head or when the implement is pushed forwardly. The flared sides 1, converging toward the lower enlarged extremity 5 of the handle 4, are effective in holding weeds or other growths, as well as soil, which are adapted to be lifted, by reason of the fact that the rearward movement of the weeds, soil, or other material toward the lower enlarged extremity of the handle or into the gradually-contracted portion of the head will be compressed, and by this means the head of the implement may be used advantageously as a scoop. By forming the bottom 2 semicircular or rounded, as stated, all wearing angles are removed, and the durability of the head is thus materially enhanced. Furthermore, the provision of the semicircular or rounded bottom 2 will be of assistance in the easy movement of the head during lawn-trimming or furrow-forming operations. Another advantage accruing from the angular disposition of the lower enlarged extremity of the handle and its projection forwardly to the extent mentioned into the head is that the latter may be more readily cleaned, especially when working in moist soil.

The implement thus far described also has means in connection therewith for limiting the depth of penetration of the head, and one of the sides has at the rear an upwardly-projecting outwardly-bent bearing extension 9, integrally formed therewith, to support an antifrictional roller 10, which has its maximum depending portion on a line with the upper edge of the side against which it is disposed, so as not to interfere with the full penetration of the head. This antifrictional roller 10 is adapted to bear on the edge of a sidewalk or other surface adjacent to the edge of a lawn during the propulsion of the implement in trimming operations or in forming furrows.

The simplified form of the implement is shown by Figs. 5, 6, and 7 and is of the same construction as the implement just described, without the bearing extension 9 and antifrictional roller 10, and similar reference-numerals are applied to the corresponding parts. The feature of the forwardly-flaring sides of the head, the lower enlarged extremity of the handle projected downwardly and forwardly between the sides, the semicircular or rounded bottom, and the forward sharpened continuous edges are all present in this modified form of the implement. It will be obvious that in view of the absence of the bearing extension 9 and antifrictional roller 10 in this latter form of implement the cost of manufacture will be accordingly reduced, and it is proposed to use such simplified implement for work where it is not necessary to have any means to obstruct the penetration of the head.

The handle may be of either wood or metal, but it is preferably formed of wood to preserve the lightness of the implement, and the particular mode of fastening the lower enlarged extremity of the handle in the head as set forth is not essential, so long as such extremity is embraced between the sides and projected forwardly into said head, to strengthen and render the head rigid.

Having thus described the invention, what is claimed is—

1. In an implement of the class set forth, the combination of a head having sides of equal vertical extent which are perpendicularly straight and longitudinally flared toward the front extremity of the implement, the said sides merging regularly into a rounded bottom, the front edges of the sides and bottom being sharpened, and a handle having a lower enlarged extremity fitted in the rear portion of the head and disposed at a rearward and upward angle of inclination, the upper surface of the lower enlarged extremity of the handle being flat.

2. In an implement of the class set forth, the combination of a head having perpendicularly-straight sides of equal extent merging into a rounded bottom to avoid the formation of angles at the intersection of the sides and bottom, the front edges of the sides and bottom being sharpened, and a handle secured in the rear extremity of the head and having an upward angle of inclination with respect to the latter.

3. An implement of the class set forth, having a head with perpendicularly-straight sides of equal vertical extent merging into a rounded bottom, the sides longitudinally flaring toward the front edge of the head and the front terminals of the sides and bottom sharpened, and a handle secured to the rear extremity of the head and serving as a closing means for said extremity.

4. An implement of the class set forth, having vertical sides merging into a rounded bottom, one of the sides having an outwardly-bent bearing extension integrally formed therewith, an antifrictional roller held in the said bearing extension, and a handle secured to the rear portion of the head.

5. An implement of the class set forth, having vertical sides, one of the sides having an outwardly-bent bearing extension integrally formed therewith, an antifrictional roller held by the bearing extension, the downward maximum projection of the roller being in line with the upper edge of the side against which it is positioned, and a handle secured to the rear portion of the head.

In testimony whereof I have hereunto set my hand in presence of two subscribing witnesses.

WILLIAM C. FLUGAN.

Witnesses:
JAMES G. MOORE,
WALTER C. NEVIN.